United States Patent [19]

Berchtold

[11] Patent Number: 4,552,014
[45] Date of Patent: Nov. 12, 1985

[54] TOOTH FLANK PROFILE MEASURING APPARATUS CONTAINING A FEELER FOR DETERMINING THE SURFACE ROUGHNESS OF A TOOTH FLANK

[75] Inventor: Nikolaus Berchtold, Zürich, Switzerland

[73] Assignee: Maag Gear-Wheel & Machine Company Limited, Zürich, Switzerland

[21] Appl. No.: 682,089

[22] Filed: Dec. 17, 1984

[30] Foreign Application Priority Data

Dec. 21, 1983 [CH] Switzerland ............... 6805/83

[51] Int. Cl.[4] ............... G01B 5/28; G01B 5/20
[52] U.S. Cl. ............... 73/105
[58] Field of Search ............... 73/105, DIG. 3; 324/207, 208; 33/148 H, 149 J

[56] References Cited

U.S. PATENT DOCUMENTS 3,254,530 6/1966 Ohringer ............... 73/105

Primary Examiner—S. Clement Swisher
Attorney, Agent, or Firm—Werner W. Kleeman

[57] ABSTRACT

The feeler in the tooth flank profile measuring apparatus for determining the roughness of the tooth flank surface comprises a Hall-effect sensor placed in a static magnetic field between two permanent magnets instead of the otherwise conventional piezo-electric or inductive measuring system. One of the two permanent magnets is adjustably mounted at one end of a feeler rod or arm which carries at its other end a feeler tip for scanning the tooth flank surface. A conventional cross-spring joint serves to rotationally mount the feeler rod or arm. The cross-spring joint need not be distorted or loaded for adjusting the bearing load of the feeler tip because there is provided for this purpose a magnetic bearing load adjustment device. The magnetic bearing load adjustment device not only compensates for the biasing force of the two permanent magnets of the measuring system, but generates a selectable bearing load for the feeler tip by overcompensating for the biasing force of the permanent magnets of the measuring system. This selectable bearing load for the feeler tip can be already measured during the adjusting operation. Since this bearing load is generated by the magnetic fields and since the cross-spring joint need not be distorted, the feeler has a substantially greater mobility and a substantially wider frequency response compared to known feelers. The feeler additionally has a simpler mechanical structure and the circuitry in the evaluation circuit is substantially less complicated in comparison to known feeler arrangements.

7 Claims, 2 Drawing Figures

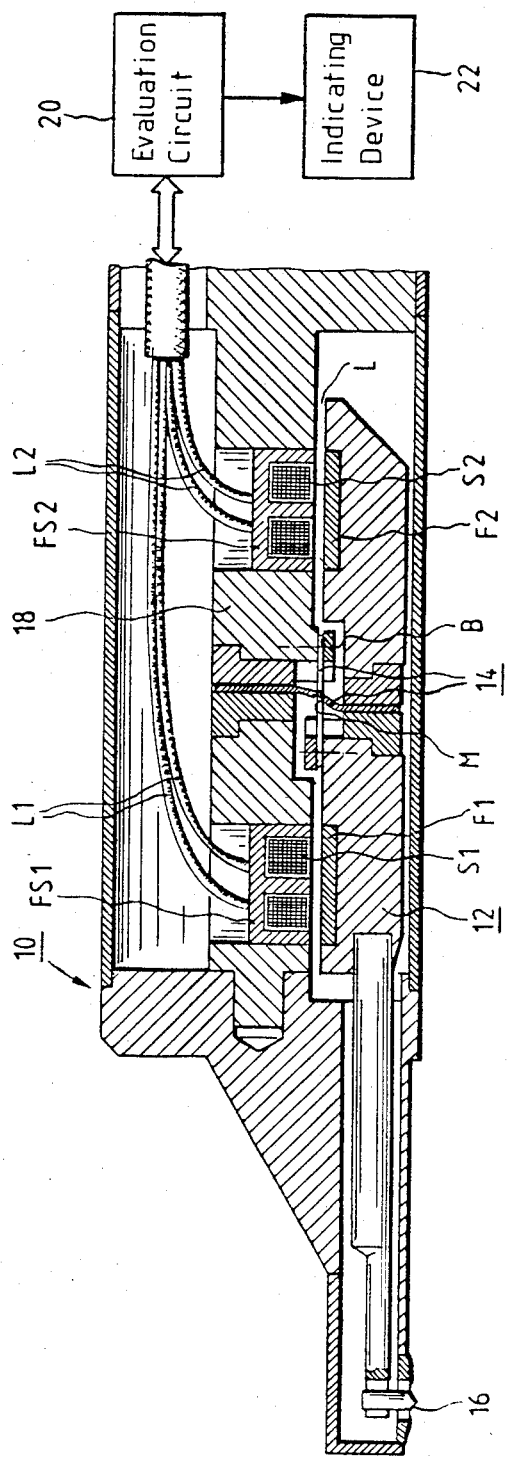

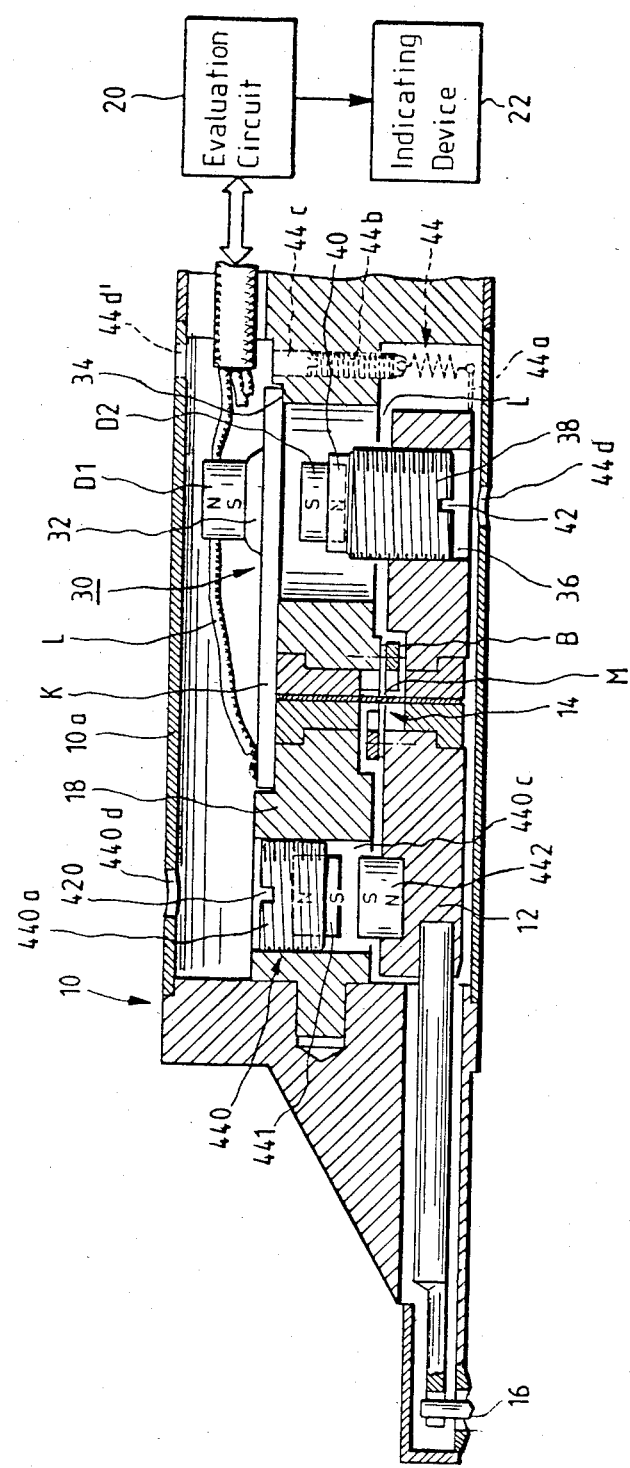

TOOTH FLANK PROFILE MEASURING APPARATUS CONTAINING A FEELER FOR DETERMINING THE SURFACE ROUGHNESS OF A TOOTH FLANK

CROSS REFERENCES TO RELATED APPLICATIONS

This application is related to (i) the commmonly assigned, copending U.S. application Ser. No. 06/560,999, filed Dec. 13, 1983, entitled "Gear Measuring Feeler", and (ii) the commonly assigned, copending U.S. application Ser. No. 06/680,363, filed Dec. 11, 1984, and entitled "Gear Measuring Feeler".

BACKGROUND OF THE INVENTION

The present invention relates to a new and improved construction of a tooth flank profile measuring apparatus for determining the roughness of a tooth flank surface.

In its more particular aspects the present invention specifically relates to a new and improved construction of a tooth flank profile measuring apparatus for determining the roughness of a tooth flank surface and which comprises a feeler rod or arm which is pivotably mounted in a housing and which carries at one end thereof a feeler or scanner tip for scanning the tooth flank surface, a measuring system generating signals which correspond to deflections of the feeler tip and which are supplied to an evaluation circuit, and further comprises a device for adjusting the bearing load of the feeler tip and acting upon the feeler rod or arm.

In a gear measuring machine as known, for example, from the MAAG brochure No. A-62-D3.81 and entitled "The New Gear Measuring Machine PH-40," see particularly pages 5 and 17 thereof, a surface feeler or scanner is mounted in the feeler or scanner holder of a feeler or scanner slide or carriage which otherwise receives the stylus or scanner for examining the involute shape of a tooth flank. In order to measure the roughness of the surface, the feeler or scanner tip of the surface feeler or scanner is applied to a tooth flank to be investigated; conventionally the feeler or scanner tip constitutes a diamond tip. The feeler or scanner tip scans the surface of the tooth flank. Deflections of the feeler or scanner tip are caused by the surface roughness and are detected by the measuring system which generally is connected to an indicating device via an evaluation circuit. In the known surface feeler or scanner there is used a piezo-electric measuring system and therein a rod of ceramic material is mechanically deformed due to the deflection of the feeler or scanner tip and thereby generates a signal which constitutes a piezo-electric voltage. The thus generated piezo-voltage is dependent on the deformation rate of the ceramic rod and, therefore, such piezo-electric systems have the disadvantage that slow-rate measuring movements or displacements cannot be received in the evaluation circuit without employing specific and complicated measures.

In further already known surface feelers or scanners an inductive carrier frequency system is used instead of the piezo-electric measuring system. The construction of such a known surface feeler or scanner is illustrated in FIG. 1 which is now referred to. A feeler rod or arm is generally designated by reference numeral 12 and this feeler rod or arm 12 is mounted in a housing, which is generally designated by reference numeral 10, by means of a cross-spring joint 14 such that the feeler rod or arm 12 is rotatable or pivotable about a fulcrum or point of rotation M which is located within the sectional plane of the illustration of FIG. 1. At one end, which is the left end in FIG. 1, the feeler rod or arm 12 is provided with a feeler or scanner tip 16 for scanning the surface of the flank of a not particularly illustrated gear. Two coils S1 and S2 with ferrite cup cores FS1 and FS2 are fixedly attached to a support body or member 18 which is secured in the housing 10. Ferrite cores F1 and F2 are fixedly attached to the feeler rod or arm 12 and each one of the ferrite cores F1 and F2 is arranged in an opposing relationship with respect to a related one of the ferrite cup cores FS1 and FS2. The coils S1 and S2 are connected via respective wires or leads L1 and L2 to an evaluation circuit 20 which is only schematically illustrated. An indicating device 22 is connected to the evaluation circuit 20. The surface feeler or scanner is illustrated in FIG. 1 in an excessively large scale; in reality the coils S1 and S2 have an outer diameter of only about 3 millimeters.

The internal structure of the evaluation circuit 20 is not shown in detail since the carrier frequency system used in the known surface feeler or scanner shown in FIG. 1 is generally known and of conventional structure. The evaluation circuit 20 for such carrier frequency system as shown in FIG. 1 contains a carrier frequency oscillator generating a carrier frequency voltage which is applied to the coils S1 and S2. The two coils S1 and S2 are arranged in the diagonal of a carrier frequency bridge system which is part of the evaluation circuit 20. During deflection of the feeler rod or arm 12 the air gap L between one of the coils S1 or S2 and the related ferrite core F1 or F2 is increased while the air gap formed between the other coil S2 or S1 and the related ferrite core F2 or F1 is reduced. The bridge circuit is thereby detuned and as a result a corresponding signal is generated. In the use of an inductive feeler or scanner system of the kind as illustrated in FIG. 1 there results the problem that the upper limiting or cut-off frequency is readily reached if it is intended to construct a fairly precise system using an acceptably complicated circuit. In the known feeler or scanner the coils S1 and S2 are operated at a carrier frequency in the range of 20 KHz. Theoretically a signal frequency in the range of 2 KHz can thus be achieved, i.e. a frequency response covering the range of 0 to 2 Khz.

A further problem in the surface feeler or scanner described hereinbefore results from the type of adjustment for the bearing load applied by the feeler or scanner tip. In order to ensure a defined bearing load of the feeler or scanner tip at all times, the feeler or scanner tip has to be biased relative to the flank surface which is to be investigated. For this purpose there are provided in the known feeler or scanner apparatus mounting bolts or screws B for the horizontal spring leaves or blades of the cross-spring joint 14. In order to adjust the bearing load, the mounting bolts or screws B are released and the feeler rod or arm 12 is forwardly displaced in a direction towards the feeler or scanner tip 16. During this operation the vertically extending spring leaf of the cross-spring joint 14 is bent in the forward direction. Consequently, and after re-tightening of the mounting bolts or screws B, the vertically extending spring leaf of the cross-spring joint 14 remains in the forwardly bent position and exerts a biasing force or bearing load upon the feeler rod or arm 12 and thus upon the feeler or scanner tip 16.

It is one of the major disadvantages of this type of adjusting of the biasing or bearing load that this force or load cannot be measured during the adjusting operation but only after the adjustment has been made. The correct adjustment of the force or load thus can only be found by experiments which represents a work-intensive operation. This problem is additionally aggravated by the fact that the size of the air gap L should have the best-defined possible size and a very small magnitude so that there is obtained the greatest possible control or operative range. This is only theoretically possible in the known feeler or scanner apparatus. A generally employed magnitude of the bearing load is in the range of 1.6 pond. In order to obtain such bearing load, the cross-spring joint 14 must be subjected to a spring bias which is at least thirty to fifty times as great. The considerable deformation or distortion of the cross-spring joint 14 required therefor results in a significant reduction in the mobility of the feeler rod or arm 12 which can have a very detrimental effect for the reasons stated hereinbelow.

The known surface feeler or scanner initially mentioned hereinabove contains a piezo-electric measuring system instead of the coil measuring system. Otherwise the piezo-electric measuring system essentially is of the same mechanical construction as the inductively operating feeler or scanner. A special driving or traversing apparatus is employed for a motor-driven reciprocation of the feeler or scanner tip in its engagement to the tooth flank. The driving or traversing apparatus contains a small-size motor and exchangeable bell-shaped curves or cams and the driving or traversing speed is selected such that the feeler rod or arm has sufficient mobility. When such a feeler or scanner system is inserted into the initially mentioned feeler or scanner holder, but without the driving or traversing apparatus, and when the same measuring drive or traversing means are used which are already present for profile testing in the tooth flank profile measuring apparatus, there results the problem that the mobility of the feeler rod or arm is insufficient. When the feeler or scanner tip actually scans the tooth flank in the region between the base of the tooth and the top land thereof, a change in the rate or speed results which corresponds to a ratio of about 1:4 although the gear rotates at a constant speed during the measurement. Additionally, the measuring rate can be changed by rotating the gear at higher speeds during the measurement which would correspond to a 1:20 ratio. Therefore high requirements are placed upon the surface feeler or scanner with respect to its frequency response, and thus, also with respect to its mobility, and such requirements cannot be fulfilled at all by the known surface feelers or scanners without the driving or traversing apparatus.

SUMMARY OF THE INVENTION

Therefore, with the foregoing in mind it is a primary object of the present invention to provide a new and improved construction of a tooth flank profile measuring apparatus for determining the roughness of a tooth flank surface and which construction permits a control of the bearing load adjustment already during the adjusting operation.

Another significant object of the present invention is directed to the provision of a new and improved construction of a tooth flank profile measuring apparatus for determining the roughness of a tooth flank surface and which construction results in a simpler mechanical structure and a substantially less elaborate circuitry.

Now in order to implement these and still further objects of the invention, which will become more readily apparent as the description proceeds, the apparatus of the present development is manifested by the features that, the measuring system comprises a Hall-effect sensor and means for generating a static magnetic field. Such Hall-effect sensor and generating means are movably arranged relative to each other and are mounted at the housing and at the feeler rod or arm, respectively. The bearing load adjustment device for adjusting the bearing load of the feeler or scanner tip is arranged in a spaced relationship from the fulcrum or point of rotation of the feeler rod or arm.

Instead of the coil system used in the known tooth flank profile measuring apparatus for determining the roughness of a tooth flank surface, the inventive system employs a conventional Hall-effect sensor which is arranged in a static magnetic field. Due to the deflection of the feeler or scanner tip a relative movement is caused between the Hall-effect sensor and the means for generating the static magnetic field and this relative movement results in the generation of a measuring signal. By using the Hall-effect sensor instead of the hitherto usual inductive or piezo-electric system, on the one hand, the frequency-response range can be considerably enlarged and encompass a control or operative range of 0 to 10 KHz which is provided without any problems. On the other hand, the electronic requirements for realizing the evaluation circuit are significantly reduced because, as is well known, in the most simple case the Hall-effect sensor substantially needs only an operational amplifier which is connected thereto and constitutes the evaluation circuit, see in this respect the book entitled "Hall Effect Transducors, how to apply them as sensors", published by MICRO SWITCH, A HONEYWELL DIVISION, Freeport, Ill. 61032, 1982, page 87, FIG. 4–37. In this literature there are additionally described other types of Hall-effect sensors which can be used in combination with the inventive tooth flank profile measuring apparatus for determining the roughness of a tooth flank surface.

Preferably, the inventive measuring apparatus may also contain a cross-spring joint for rotatably or pivotably mounting the feeler rod or arm. However, the cross-spring joint does not require any biasing for generating the bearing load since a separate device is provided for generating such bearing load. This separate device is spaced from the fulcrum or point of rotation of the feeler rod or arm. The mobility of the feeler rod or arm is substantially improved thereby and the bearing load can be already measured during the adjusting operation.

There is thus not only obtained, by employing the aforementioned means, a simpler construction of the feeler or scanner apparatus, but there is also avoided the use of a coil system which is very complicated in terms of manufacture and adjustment, by employing the Hall-effect sensor since conventional Hall-effect sensors are already provided with an integrated amplifier and an appropriate voltage stabilizer.

In an advantageous further development of the inventive tooth flank profile measuring apparatus for determining the roughness of a tooth flank surface, the means for generating the static magnetic field comprise two permanent magnets and the Hall-effect sensor is fixedly attached therebetween within the housing. Depending on whether like or unlike poles of these permanent magnets face each other, the adjustment device for adjusting the bearing load of the feeler or scanner tip may constitute either a tension spring or a compression spring. In order to compensate for the force exerted by the permanent magnets of the measuring system on the feeler rod or arm, the tension spring or compression spring is arranged between the feeler rod or arm and a support body on one or the other side of the fulcrum or point of rotation of the feeler rod or arm. The force exerted by the tension spring or by the compression spring can be adjustable.

A further permanent magnet of the bearing load adjustment device can be directly mounted at the Hall-effect sensor. There thus results a defined level control of the Hall-effect sensor close to the limit of its control or operative range and this level control is modulated by the very small motion of the permanent magnet which is mounted at the feeler rod or arm. Consequently, a very large total output signal is thus obtained.

In a further preferred construction of the inventive tooth flank profile measuring apparatus for determining the roughness of a tooth flank surface the bearing load adjustment device for the feeler or scanner tip comprises two permanent magnets. The air gap existing between the two permanent magnets is adjusted in such a manner that the force generated by these two permanent magnets compensates for the force which is produced by the means for generating the static magnetic field. When this force produced by the static magnetic field is overcompensated by appropriate adjustment of the air gap between the two permanent magnets of the bearing load adjustment device, a selectable bearing load of the feeler or scanner tip can be adjusted in a simple manner. In this construction of the inventive apparatus the bearing load is in effect generated by the magnetic fields, whereby any mechanical inertia is eliminated and a particularly wide-range mobility of the feeler or scanner is provided. Actually, the mobility of the feeler or scanner anyhow is greater than in the known surface feeler or scanner apparatus since the cross-spring joint does not require any biasing in order to generate the bearing load.

Advantageously, the like poles of the permanent magnets which generate the static magnetic field or measuring magnetic field and of the permanent magnets in the bearing load adjustment device for the feeler or scanner tip are arranged in an opposing relationship, whereby the Hall-effect sensor can be controlled in a particularly well-defined manner.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 1 is a longitudinal sectional view of a prior art tooth flank profile measuring apparatus for determining the roughness of a tooth flank surface, wherein the evaluation circuit and the indicating device are only schematically shown; and FIG. 2 is a longitudinal sectional view of the inventive tooth flank profile measuring apparatus for determining the roughness of a tooth flank surface in a view similar to FIG. 1.

DETAILED DESCRIPTION OF THE PREFERRED EMBODIMENTS

Describing now the drawings, it is to be understood that only enough of the construction of the feeler or scanner apparatus has been shown as needed for those skilled in the art to readily understand the underlying principles and concepts of the present development, while simplyfing the showing of the drawings. Turning attention now specifically to FIG. 2, the exemplary embodiment of the inventive tooth flank profile measuring apparatus for determining the roughness of a tooth flank surface differs from the prior art apparatus illustrated in FIG. 1, as already noted hereinbefore, mainly with respect to the design of the measuring system, the evaluation circuit 20 and the bearing load adjustment device for the feeler or scanner tip.

As shown in FIG. 2, the measuring system comprises a Hall-effect sensor generally designated by the reference numeral 30, two permanent magnets D1 and D2 which are diametrically arranged on opposite sides of the Hall-effect sensor 30 and generate a static magnetic field or static measuring magnetic field, and an evaluation circuit 20 which in the presently described exemplary embodiment of the inventive feeler or scanner simply can be constituted by a simple operational amplifier as mentioned initially. Therefore, the evaluation circuit 20 is not described here in any particular detail.

The Hall-effect sensor 30 constitutes a conventional electronic component or element. As such the Hall-effect sensor 30 comprises an integrated circuit on a ceramic plate or platelet K which is covered by a brass cap 32 and which contains the actual Hall-effect generator, a voltage regulator and an amplifier. The electronic circuit arranged at the ceramic plate or platelet K is connected to the evaluation circuit 20 by wires or leads L. The top permanent magnet D1 is directly secured to the brass cap 32 as, for example, by adhesive bonding. The ceramic plate or platelet K is mounted at the housing 10 by means of a support body 18 and adhesive bonding or any other appropriate bonding or fastening means.

The support body 18 is provided with a cut-out or recess 34 on the side of the ceramic plate or platelet K which is remote from the top permanent magnet D1. The part of the feeler rod or arm 12 which is placed in opposing relationship relative to the cut-out or recess 34, is provided with a threaded bore 36. A magnet holder 38 is threaded thereinto and comprises a blindhole bore 40 on the end face thereof which faces the ceramic plate or platelet K. The base permanent magnet D2 is mounted in the the blindhole bore 40 by for example, adhesive bonding. At the opposite end face the magnet holder 38 is provided with a slot 42 into which the edge of a screwdriver or the like can be introduced through an opening 44d which is provided in the housing 10 below the slot 42. The mutual distance between the permanent magnets D1 and D2 thus can be easily adjusted.

In the exemplary embodiment the permanent magnets D1 and D2 are arranged in such a manner that the like poles of the permanent magnets D1 and D2 face each other. The permanent magnets D1 and D2 thus not only generate the static magnetic field or measuring magnetic field which generates, in the Hall-effect sensor 30, a signal corresponding to the deflection of the feeler or scanner tip 16 when the permanent magnet D2 approaches the Hall-effect sensor 30 or moves away therefrom during the deflection. Additionally, the permanent magnets D1 and D2 also generate a repulsive force which tends to rotate or pivot the feeler rod or arm 12 in the clockwise direction. This repulsive force requires compensation and, according to the invention, this repulsive force is not only compensated but overcompensated for, specifically by means of the bearing load adjustment device for adjusting the bearing load of the feeler or scanner tip 16. As a consequence, this bearing load can be adjusted in a finely proportioned manner.

In the most simple case a suitable means for adjusting the bearing load of the feeler or scanner tip 16 would constitute a mechanical spring arrangement 44 which is only schematically indicated by broken lines in FIG. 2. In the presently described exemplary embodiment in which like poles of the permanent magnets D1 and D2 face each other, the illustrated spring arrangement 44 constitutes a tension spring. One end of the tension spring is mounted or anchored to an arm 44a connected to the feeler rod or arm 12 and the other end of the tension spring could be rotationally movably inserted into the lower end of an adjustment screw 44b. By rotating the adjustment screw 44b in its associated threaded bore 44c, for instance by means of a screwdriver inserted through an opening 44d' of the housing 10, the force generated by the tension spring can be readily adjusted. When the permanent magnets D1 and D2 are poled in the opposite manner, a compression spring would be used.

The spring arrangement 44 could also be arranged in a corresponding manner on the other side of the fulcrum or point of rotation M of the feeler rod or arm 12 in which case the tension spring would be replaced by a compression spring and vice versa. However, the spring arrangement 44 is intended just as an example of mechanical means for adjusting the bearing load of the feeler or scanner tip 16. Actually a magnetic device is preferred for this purpose. Such magnetic device is generally designated by reference numeral 440 in FIG. 2 and will be described in detail hereinafter.

The magnetic means 440 for adjusting the bearing load of the feeler or scanner tip 16 contains two permanent magnets 441 and 442 which may be made of the same material as the permanent magnets D1 and D2. The top permanent magnet 441 is affixed, for example, by adhesive bonding or any other appropriate bonding or fastening means to a cup-shaped magnet holder 440a which is provided with an exterior thread and which is threaded into a threaded bore 440c. The base or bottom permanent magnet 442 is fixed, for example, by adhesive bonding in a blindhole bore which is provided in the feeler rod or arm 12 opposite the threaded bore 440c. In the illustrated exemplary embodiment the permanent magnets 441 and 442 are arranged with their like poles in an opposing relationship and thus generate a repulsive force tending to rotate the feeler rod or arm 12 in the counterclockwise direction. The magnitude of this force is adjusted by adjusting the spacing between the permanent magnets 441 and 442. For this purpose the magnet holder 440a is provided at the top side thereof with a slot 420 into which the edge of a screwdriver or the like can be inserted which can be introduced through an opening 440d provided in the housing 10.

In the presently described exemplary embodiment the spacing between the permanent magnets D1 and D2 which generate the static magnetic field or measuring magnetic field and the permanent magnets 441 and 442 generating the bearing load of the feeler or scanner tip 16 can be adjusted by means of suitable fine threads. Instead thereof any other appropriate adjusting means can be employed to maintain one of the permanent magnets of each one of the aforementioned pairs of permanent magnets in an adjustable and well-defined position with respect to the other permanent magnet of such pair.

The magnetic bearing load adjustment device 440 is adjusted by rotating the magnet holder 440a in such a manner that there is exerted on the feeler rod or arm 12 a force which is somewhat greater than the force required in order to compensate for the force generated by the permanent magnets D1 and D2 of the measuring system. There thus results an excess force which represents the bearing load with which the feeler or scanner tip 16 is pressed against a tooth flank. The desired bearing load which is intended to be adjusted can be precisely controlled and measured during the adjusting operation by means of an apparatus as used, for example, for measuring the bearing load of the pick-up arm in a record player.

In the exemplary embodiment of the inventive tooth flank profile measuring apparatus for determining the roughness of a tooth flank surface illustrated in FIG. 2, the bearing load is adjusted outside the fulcrum or point of rotation M of the feeler rod or arm 12 by means of the spring arrangement 44 or by means of the magnetic bearing load adjustment device 440. Consequently, the disadvantageous deformation or distortion of the cross-spring joint or hinge arrangement 14 at the fulcrum or point of rotation M is eliminated in the inventive apparatus. This will be readily evident from a comparison of FIG. 2 and FIG. 1 because in the illustration of FIG. 2 the vertically extending spring leaf of the cross-spring joint 14 is not bent in the region of the fulcrum or point of rotation M of the feeler rod or arm 12. The feeler or scanner in the exemplary embodiment shown in FIG. 2 has a substantially smaller mechanical inertia than the prior art feeler or scanner illustrated in FIG. 1. Consequently, the feeler or scanner of the inventive apparatus shown in FIG. 2 has a greater mobility because the bearing load is generated only by magnetic fields instead of by a deformation of the cross-spring joint 14.

A portion 10a of the housing 10 is designed as a steel cylinder and thus serves as a screen against external spurious or interfering effects. A well-defined level control of the Hall-effect sensor 30 close to the limit of its operative range is already achieved by directly mounting the permanent magnet D1 at the Hall-effect sensor 30. This level control is then modulated due to the very small movement of the second permanent magnet D2, during the deflection of the feeler or scanner tip by the roughness of the tooth flank surface. Altogether there is thus obtained a large signal. The support body 18 does not affect the magnetic fields because it is preferably made of aluminum.

While there are shown and described present preferred embodiments of the invention, it is to be distinctly understood that the invention is not limited thereto, but may be otherwise variously embodied and practiced within the scope of the following claims. Accordingly,

What I claim is:

1. A tooth flank profile measuring apparatus for determining the roughness of a tooth flank surface, comprising:
a housing;
a feeler rod pivotably mounted in said housing and said feeler rod defining an end;
a feeler tip for scanning the surface of said tooth flank and provided at said end of said feeler rod;
a measuring system operatively connected to said feeler rod and generating signals responsive to the deflection of said feeler tip while the same scans said surface of the tooth flank;
said measuring system comprising a Hall-effect sensor and means for generating a static magnetic field;
said Hall-effect sensor and said means for generating the static magnetic field being movable relative to each other;
one of said Hall-effect sensor and said means for generating a static magnetic field being mounted either at said housing or at said feeler rod and the other one of said Hall-effect sensor and said means for generating a static magnetic field being mounted either at said feeler rod or at said housing;
an evaluation circuit supplied with said signals generated by said measuring system in response to the deflection of said feeler tip while the same scans said surface of the tooth flank;
a bearing load adjustment device acting upon said feeler rod in order to adjust the bearing load of said feeler tip at said surface of the tooth flank while said feeler tip scans the surface of the tooth flank;
said pivotably mounted feeler rod defining a predetermined fulcrum; and
said bearing load adjustment device being arranged in spaced relationship with respect to said predetermined feeler rod fulcrum.

2. The tooth flank profile measuring apparatus as defined in claim 1, wherein:
said means for generating the static magnetic field constitute at least one permanent magnet; and
said at least one permanent magnet being adjustably mounted at said feeler rod.

3. The tooth flank profile measuring apparatus as defined in claim 2, wherein:
said at least one permanent magnet of said means for generating the static magnetic field contains an additional permanent magnet which constitutes a further permanent magnet;
said Hall-effect sensor defining a side remote from said feeler rod; and
said further permanent magnet being arranged on said side of said Hall-effect sensor which is remote from said feeler rod.

4. The tooth flank profile measuring apparatus as defined in claim 3, wherein:
said further permanent magnet is secured in said housing on said side of said Hall-effect sensor which is remote from said feeler rod.

5. The tooth flank profile measuring apparatus as defined in claim 3, wherein:
said further permanent magnet is directly mounted at said Hall-effect sensor on said side thereof which is remote from said feeler rod.

6. The tooth flank profile measuring apparatus as defined in claim 1, wherein:
said bearing load adjustment device comprises two permanent magnets;
one of said two permanent magnets of said bearing load adjustment device being connected to said housing and another one of said two permanent magnets of said bearing load adjustment device being connected to said feeler rod; and
said two permanent magnets of said bearing load adjustment device being arranged at an adjustable mutual spacing.

7. The tooth flank profile measuring apparatus as defined in claim 6, wherein:
said two permanent magnets of said bearing load adjustment device being arranged in an opposing relationship with respect to like poles thereof; and
said permanent magnet and said further permanent magnet of said means for generating the static magnetic field being arranged in an opposing relationship with respect to like poles thereof.

* * * * *